Aug. 30, 1960  R. L. PILLOTON  2,951,091

PROCESS FOR THE CONCENTRATION OF FORMIC ACID SOLUTIONS

Filed Jan. 28, 1958 2 Sheets-Sheet 1

INVENTOR.
ROGER L. PILLOTON
BY
ATTORNEY

United States Patent Office 2,951,091
Patented Aug. 30, 1960

2,951,091

PROCESS FOR THE CONCENTRATION OF FORMIC ACID SOLUTIONS

Roger L. Pilloton, Niagara Falls, N.Y., assignor to Union Carbide Corporation, a corporation of New York Filed Jan. 28, 1958, Ser. No. 711,671

5 Claims. (Cl. 260—542)

The present invention relates to a process for the concentration of formic acid solutions and, more particularly, to a liquid extraction process for the concentration of formic acid solutions from dilute aqueous formic-acid containing solutions.

Aqueous solutions of formic acid can be readily produced at relatively low costs. The aqueous formic acid produced, however, is generally quite dilute, usually in the order of a 20 to 25 percent solution. Solutions of this strength, for use in most commercial applications, must be concentrated to about 90 percent.

Heretofore, dilute formic acid solutions have been concentrated by means of a very careful distillation procedure. Extreme difficulties are encountered in such distillation because formic acid and water have extremely close boiling points, i.e., 100.7 and 100.0 degrees centigrade, respectively. Further difficulties are also encountered in separation procedures due to the fact that formic acid and water form an azeotrope at 22.5 percent formic acid and 77.5 percent water. In addition to the above-mentioned difficulties, the cost of concentrating aqueous formic acid solutions is high.

Accordingly, the primary object of the present invention is to provide a simplified process for concentrating dilute aqueous formic acid solutions.

Other aims and advantages of the present invention will be apparent from the following description and appended claims.

In accordance with the present invention, a process is provided for the concentration of a dilute aqueous formic acid solution comprising admixing the aqueous formic acid solution with at least one salt selected from the group consisting of calcium chloride, magnesium chloride and magnesium sulfate, contacting the mixture with at least one liquid organic extractant selected from the group consisting of dialkyl ethers and dialkyl ketones wherein the alkyl groups of the ethers and ketones can have up to about 10 carbon atoms and the ethers and ketones have boiling points from about 34 to 190 degrees centigrade. The liquid organic extractants employed are those having substantial insolubility in water and an ability to produce a non-azeotropic mixture with formic acid. Subsequently, the aqueous and organic phase are separated from each other and the formic acid is recovered from the organic phase.

Figure 1:
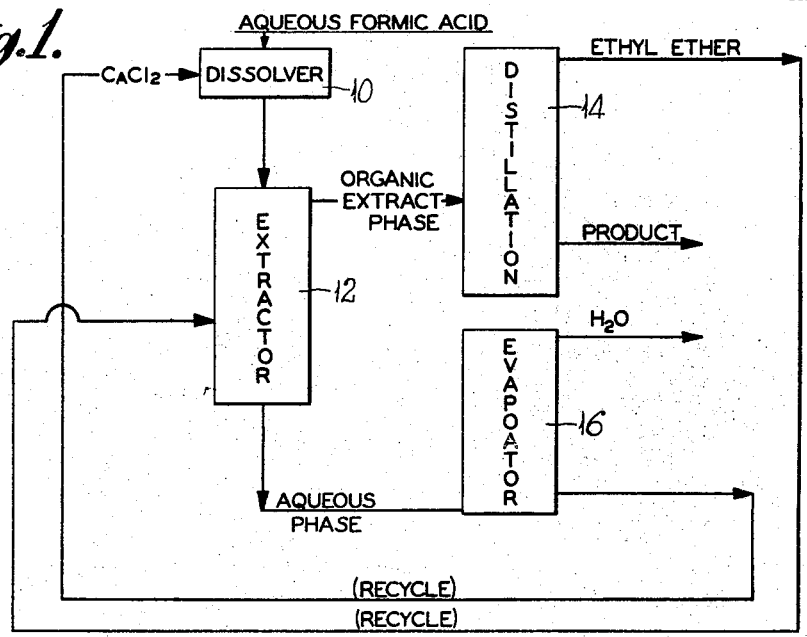
Figure 1 is a simplified schematic flow diagram of the process of the present invention.

Apparatus suitable for carrying out the process of the invention is generally illustrated in Fig. 1 which shows a dissolver 10, an extractor 12 associated therewith, distillation apparatus 14 communicating with extractor 12 and an evaporator 16 connected with extractor 12.

In operation, a salt, such as calcium chloride, is dissolved in the aqueous formic acid solution in dissolver 10. The solution is transferred to extractor 12 wherein the orginac extractant, such as ethyl ether, is introduced countercurrently with the aqueous formic acid solution entering extractor 12; two liquid phases are formed. The organic phase, consisting of ethyl ether and formic acid, is separated from the aqueous phase consisting of calcium chloride and water. The organic phase is conveyed to distillation apparatus 14 where the formic acid and ethyl ether are recovered. The ethyl ether is recycled to extractor 12 and the aqueous phase is conveyed to evaporator 16 where the calcium chloride is recovered, and recycled to dissolver 10.

A multi-step embodiment of the process of the invention can be illustrated by reference to Fig. 2 which shows extractor 18, a dissolver 20 associated therewith, separator 22 communicating with dissolver 20, distillation apparatus 24 connected to separator 22, an evaporator 26 associated with separator 22 and a second distillation apparatus 28 communicating with extractor 18.

In the first step, an aqueous formic acid solution and an organic extractant, such as ethyl ether, are introduced into extractor 18 countercurrently and two liquid phases form. The first organic phase consisting of ethyl ether, formic acid and small quantities of water, is separated from the first aqueous phase which consists of water and small quantities of ether. The first organic phase is conveyed to dissolver 20 and a salt, such as calcium chloride, is added. The calcium chloride lowers the miscibility of the constituents of the first organic phase and two new liquid phases are formed. These phases are transferred to separator 22 where the second organic phase and second aqueous phase are further separated. The second organic phase consisting of ethyl ether and formic acid is conveyed to distillation apparatus 24 where the ethyl ether and the formic acid are recovered. The ethyl ether is recycled to extractor 18. The second aqueous phase in separator 22 is conveyed to evaporator 26 where the calcium chloride is recovered therefrom and recycled to dissolver 20. The first aqueous phase from extractor 18 is conveyed to distillation apparatus 28 where the ethyl ether is recovered and recycled to extractor 18.

Salts that have been found suitable to substantially alter the distribution coefficient of formic acid in an aqueous and organic solution are salts selected from the group consisting of calcium chloride, magnesium chloride and magnesium sulfate.

Figure 3:
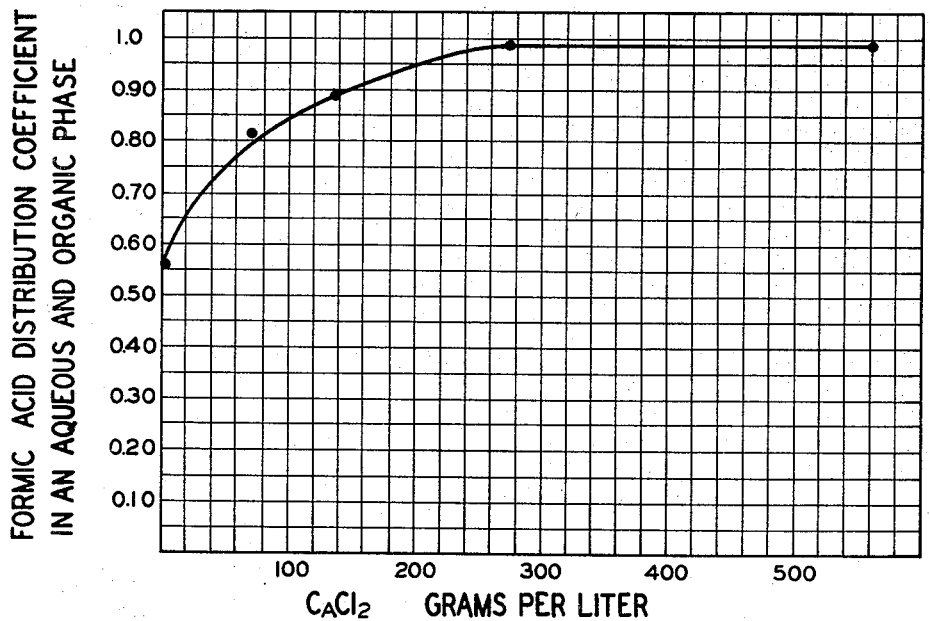
Figure 3 is a graphic illustration of the influence of calcium chloride on the distribution coefficient of formic acid.

The effect of the addition of a salt to an aqueous formic acid solution can be further illustrated by reference to Fig. 3. The salt there employed, calcium chloride, is illustrative of the effect of a salt on the distribution coefficient of formic acid in an aqueous and organic solution. Diethyl ether was employed as the organic extractant. As may be seen from Fig. 3, the distribution coefficient of formic acid, without the addition of calcium chloride, is 0.57. With the addition of 67 grams of calcium chloride per liter of water present in the solution, the distribution coefficient increases to 0.82. With the addition of 135 grams of calcium chloride per liter of water present in the solution, the distribution coefficient further increases to 0.88 and finally with the addition of 270 grams of calcium chloride per liter of water present, a maximum in the distribution coefficeint is obtained at 0.98. Additional quantities of calcium chloride may be added, but the only additional effect of the calcium chloride will be to decrease the amount of water carried over in the organic phase. Therefore, the amount of calcium chloride to be added to the formic acid solution is dependent upon the ultimate formic acid concentration desired.

Figure 2:
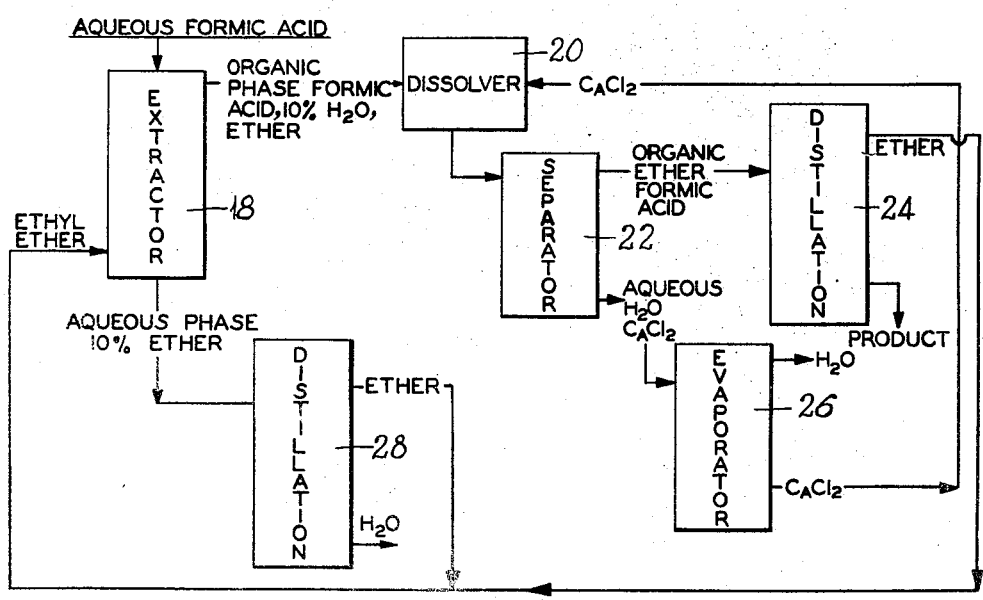
Figure 2 is a schematic flow diagram of a multi-step embodiment of the process of the present invention.

As illustrated by Fig. 1 and Fig. 2, respectively, the salt may be added to the aqueous formic acid solution either prior to or after introduction of the organic extractant.

The multi-step procedure, as shown in Fig. 2, is particularly advantageous for low concentrations of formic acid since large quantities of water may be separated from the ternary system prior to the introduction of calcium chloride. It is preferable, in this procedure, to countercurrently contact large quantities of a liquid organic extractant with about a 10 percent aqueous formic acid solution. The aqueous phase resulting from this separation will contain a minor quantity of liquid organic extractant. The liquid organic extractant may readily be recovered and the water, comprising about 90 percent of the total water of the original solution, may be discarded. A salt, such as, calcium chloride, is then added to the organic phase but in a quanttiy approximating 10 percent of that required by the simplified procedure, since only about 10 percent of the water is present in the organic phase.

It has been found that liquid organic extractants suitable for carrying out the process of the present invention are those liquid dialkyl ethers and dialkyl ketones wherein the alkyl groups of the ethers and ketones have up to about 10 carbon atoms and the dialkyl ethers and dialkyl ketones have a boiling point from about 34 to 190 degrees Centigrade. The organic extractants are also substantially insoluble in water and have an ability to produce a non-azeotropic mixture with formic acid.

The low boiling point of the extractants necessarily facilitate the separation of the formic acid from the extractant in the final stages of the process and generally assures that formic acid will not be lost during the final distillation.

The preferred ethers and ketones have low polarities as compared to the polarity of water. The polarity of water, given in terms of its dielectric constant, is 80.0. It has been found that the dialkyl ethers and dialkyl ketones, suitable for use in this invention, have polarities, in terms of their dielectric constants, of from about 4.3 to about 18.5. For example, the polarity of ethyl ether, which is one of the most desirable extractants, is 4.3; while that of acetone, which is not suitable, is 21.4.

Substantial insolubility of the liquid organic extractant in water assures that a minimum of the extractant will enter into the aqueous phase, thereby substantially eliminating the necessity of recovering the organic extractant from water. In addition, substantially all the extractant present will be available to aid in removal of the formic acid from the aqueous solution.

A substantial portion of the success of the present invention is based on the fact that the liquid organic extractant produces a non-azeotropic mixture with formic acid. The formation of an azeotropic mixture between formic acid and the extractant would substantially defeat the objects of the present invention. The process of the invention presents a simplified procedure for concentrating aqueous formic acid solutions. If the formic acid formed an azeotropic mixture with the liquid organic extractant, the process of the invention would be of little value since it is possible to separate formic acid from an aqueous solution by employing very difficult and costly distillation procedures. The present invention enables the use of simple distillation procedures by employing organic extractants that do not form an azeotropic mixture with formic acid.

Organic extractants, such as dialkyl ethers, having a total of 4 to 10 carbon atoms and dialkyl ketones having a total of 4 to 8 carbon atoms and substantially possessing the above-listed characteristics are ideally employed as extractants in carrying out the process of the present invention.

Illustrative of ethers which can be used in the invention are: diethyl ether, methyl propyl ether, ethyl propyl ether, n-propyl ether, isopropyl ether, n-butyl ether, sec-butyl ether, n-amyl ether, and isoamyl ether. The preferred ethers are those having boiling points from about 34 to 190 degrees centigrade.

Illustrative of ketones which can be used in the invention are: butanone, 3-methyl butanone-2, 3-methyl pentanone-2, 4-methyl pentanone-2, 2-methyl pentanone-3, 3,4-dimethyl pentanone-3, hexanone-2, hexanone-3, heptanone-2, heptanone-3, heptanone-4, 2,6-dimethyl pentanone-4 and octanone-2. Dialkyl ketones, such as 3,3-dimethyl butanone-2, pentanone-2, and pentanone-3, are operable but difficult to work with because of the similarity between their boiling points and that of formic acid. The preferred ketones are those having boiling points from about 80 to 174 degrees centigrade.

In a test conducted with the production of a ternary solution consisting of 77 percent water, 8 percent formic acid and 15 percent diethyl ether to which no salt had been added, an organic and aqueous phase resulted. About 4.8 percent by weight of formic acid was present in the organic phase and about 8.6 percent by weight of formic acid was present in the aqueous phase. The distribution coefficient of the formic acid was 0.57. Fractional separation of the ether from the organic phase would result in an aqueous solution containing 61 percent formic acid.

In an example of the present invention, 500 grams of an aqueous formic acid solution containing 20 percent formic acid was prepared. To this 120 grams of calcium chloride were added. Subsequently, 500 grams of diethyl ether were added. This resulted in an overall ternary liquid composition of 40 percent water, 10 percent formic acid and 50 percent ethyl ether. The organic phase contained about 9.9 percent formic acid, by weight, and the aqueous phase contained about 10.1 percent formic acid by weight. The distribution coefficient of formic acid was 0.98. Subsequent separation of the two phases and distillation of the organic phase resulted in the production of a 90.0 percent formic acid concentrate.

What is claimed is:

1. A process for the concentration of formic acid from aqueous solutions which comprises admixing aqueous formic acid solution with at least one salt selected from the group consisting of calcium chloride, magnesium chloride and magnesium sulfate, contacting said mixture with at least one liquid organic extractant selected from the group consisting of dialkyl ethers and dialkyl ketones wherein the alkyl groups of said ethers and ketones have up to about 10 carbon atoms, and said ethers and ketones have boiling points from about 34 to 190 degree centigrade, said liquid organic extractant having substantial insolubility in water and an ability to produce a non-azeotropic mixture with formic acid; separating the aqueous and organic phase from each other; and recovering the formic acid from said organic phase.

2. A process for the concentration of formic acid from aqueous solutions which comprises admixing aqueous formic acid solution with at least one salt selected from the group consisting of calcium chloride, magnesium chloride and magnesium sulfate, contacting said mixture with at least one liquid organic extractant selected from the group consisting of dialkyl ethers wherein the alkyl group of said ethers have a total of from 4 to about 10 carbon atoms and said ethers having a boiling point from about 34 to 190 degrees centigrade, said liquid organic extractant having substantial insolubility in water and an ability to produce a non-azeotropic mixture with formic acid; separating the aqueous and organic phase from each other; and recovering the formic acid from said organic phase.

3. A process for the concentration of formic acid from aqueous solutions which comprises admixing aqueous formic acid solution with at least one salt selected from the group consisting of calcium chloride, magnesium chloride and magnesium sulfate, contacting said mixture with at least one liquid organic extractant selected from the group consisting of dialkyl ketones wherein the alkyl group of said ketones has a total of from 4 to about 8 carbon atoms and said ketones having a boiling point from about 80 to 174 degrees centigrade, said liquid organic extractant having substantial insolubility in water and an ability to produce a non-azeotropic mixture with formic acid; separating the aqueous and organic phase from each other; and recovering the formic acid from said organic phase.

4. A process in accordance with claim 1, wherein the salt is calcium chloride.

5. The process in accordance with claim 1, wherein the dialkyl ether in diethyl ether.

References Cited in the file of this patent

UNITED STATES PATENTS

| | | |
|---|---|---|
| 2,714,118 | Copenhaver et al. | July 26, 1955 |
| 2,801,265 | Coutor | July 30, 1957 |

FOREIGN PATENTS

| | | |
|---|---|---|
| 728,511 | Great Britain | Apr. 20, 1955 |